2,827,421

TREATMENT OF SILICA-ALUMINA BEADS WITH AMMONIUM FLUORIDE

Henry Erickson, Calumet City, Ill., assignor to Sinclair Refining Company, New York, N. Y., a corporation of Maine No Drawing. Application October 5, 1950
Serial No. 188,655

7 Claims. (Cl. 196—52)

My invention relates to improvements in the conversion of hydrocarbon oil stocks in the presence of a particle form cracking catalyst of modified structure at a cracking temperature. More particularly, my invention relates to improvements in the conversion of hydrocarbon oil stocks in the presence of a cracking catalyst comprising synthetic silica-alumina gel in bead form by increasing the porosity of the individual catalyst particles, by improving the product distribution obtainable in the conversion reaction and by improving regenerability of the catalyst through burn-off of carbonaceous matter deposited thereon in the conversion reaction.

In present commercial cracking units, whether of the moving bed (TCC type) or the fluid type handling system, the carbon burning capacity of the regenerator is the primary limiting factor on conversion capacity for the unit and on conversion level per pass. The criticality of regenerator carbon burning capacity is accentuated in the newer designs and methods of operation which incorporate liquid feed injection and provide for cracking heavier and heavier stocks. The problem is further aggravated by a trend toward the use of more active cracking catalysts and a trend toward operation at higher catalyst-to-oil ratios. My invention provides relief for the carbon burning problem in two ways. First, it directly reduces the amount of coke which must be burned off in the regeneration process by developing more favorable product distribution under conversion conditions in terms of coke make per unit of gasoline produced. Secondly, it directly increases carbon burning capacity by improving the carbon burning rate for the spent catalysts, possibly through increased internal accessibility of the individual particles.

I have discovered that the physical structure and particularly the apparent density and porosity of synthetic silica-alumina catalyst particles are beneficially modified by treatment with dilute aqueous ammonium fluoride. I also have discovered that a significant and unexpected improvement in the product distribution obtainable in the conversion reaction is associated with the modified structure of the individual catalyst particles. Silica-alumina beads, i. e. spherical particles of about 4 mesh size appear to be especially susceptible to improvement according to my invention. For example, one of the best commercially available silica-alumina bead form catalysts has an average density of 0.70 and an average pore radius of 29 angstrom units. By contrast, a silica-alumina bead catalyst prepared in the same way from similar hydrogels but treated according to my invention has an apparent density of 0.55 and an average pore radius of 45 angstrom units.

According to my invention a hydrocarbon stock is contacted with a silica-alumina catalyst which has been reduced in apparent density and increased in porosity through treatment with dilute aqueous ammonium fluoride. Improvement is effected by reducing density about 10 to 30 percent, or in the case of bead form catalyst from the conventional 0.7 to 0.8 to about 0.5 to 0.6 apparent density. The cracked hydrocarbons and the spent catalyst are separately recovered, and the catalyst is regenerated by burning off carbonaceous matter deposited thereon with an oxygen-containing gas. My invention has particular value in application to bead form catalyst and in use of the modified beads in the conversion reaction. Possibly because of the greater pore length obtaining in beads compared to finely divided particles, coke formation, resulting in product distribution degradation at high conversion activities and difficult regenerability, is more critical. Silica-alumina beads are particularly responsive to density and porosity control through ammonium fluoride treatment, with surprising concomitant benefits in product distribution and regenerability. By silica-alumina beads, I intend to include promoted silica-alumina catalysts in bead form such as silica-alumina chrome beads containing about 0.1% chromium for example which are especially susceptible to beneficial treatment for the cracking reaction. Silica-alumina beads however, in manufacturing present a serious problem in loss through breakage and fracturing of the beads. I have found that a combined pretreatment with both ammonium fluoride and a surface active agent in aqueous solution is particularly valuable in producing bead form silica-alumina catalysts of modified structure for the conversion reaction.

Hence according to my invention the treated silica-alumina catalyst employed in the conversion reaction has been treated as a hydrogel with a small amount, e. g. about 0.1 to 1.0 percent ammonium fluoride and advantageously with about 0.1 percent but less than 1.0 percent of a surface tension reducing agent in water solution. Usually the silica-alumina catalyst is treated with the aqueous solution of ammonium fluoride and the surface tension reducing agent in the course of preparation, advantageously in the hydrogel stage, prior to drying and calcining. My invention includes modified silica-alumina catalysts of reduced density and increased porosity through dilute aqueous ammonium fluoride treatment and the method of modifying the silica-alumina catalysts in terms of density and porosity, as well as the method of improving product distribution and regenerability in the cracking process by use of dilute aqueous ammonium fluoride treated catalysts.

Silica-alumina cracking catalysts are usually prepared from a co-precipitated hydrogel of silica and alumina. The material may be made in bead form by dropping the sol or spraying the hydrogels into an oil bath containing precipitating or hardening materials. Silica-alumina micro-beads or spheres also may be formed by spray drying, or the dried gels may be ground to finely divided form. In the practice of my invention, the silica-alumina gels are treated after formation into particle form. With the catalyst beads formed by the oil drop method, it is convenient to treat the material in hydrogel form, but with those catalysts formed into beads or particles after oven drying, the processed gels are subjected to the aqueous ammonium fluoride treatment and then are redried and calcined.

I have found that the apparent density of the bead form catalysts decreases rapidly and linearly with the concentration of ammonium fluoride at least up to about 2½ percent. Larger concentrations appear to deleteriously affect activity and may deleteriously affect particle strength. The concentration is expressed in terms of the total amount of water used, including the water contained in the hydrogel to be treated. The effectiveness of the treatment is enhanced by raising the temperature of the treating solution. The concentration of ammonium fluoride required may be reduced thereby and in some instances the actual activity of the catalyst is raised. The apparent density of a conventional silica-alumina gel type catalyst approximates 0.7 to 0.8, in which case, sufficient ammonium fluoride advantageously is used to reduce the apparent density of the catalyst to about 0.5 to 0.6, In most instances, the amount of ammonium fluoride required will be somewhat less than 1.0 percent but more than 0.1 percent based on the total amount of water employed in the treatment. In any event, sufficient treating agent is used to afford a 10 to 30 percent, preferably about 20 to 25 percent reduction from the usual density after calcination. In this way, control is conveniently had over the desired structural modification as average pore radius is increased correspondingly. The treated catalysts are dried and calcined in the usual manner after treatment to complete the structural modification. Analysis of the modified catalysts indicates only a very low residual fluoride content, but often considerable reduction in alumina content. Nevertheless, total conversion activity is retained at a high level and may even be improved, particularly where hot treating solutions are employed.

One of the serious problems in manufacturing bead catalysts is the susceptibility of the beads to fissioning and fracturing in the drying and calcining steps. As disclosed in my copending application, Serial No. 141,171, filed January 28, 1950, now Patent No. 2,643,231, I have found that the use of a small amount of a surface active or surface tension reducing agent in water on the catalyst is surprisingly effective in reducing breakage during the drying process.

The useful agents are the anionic and non-ionic surface active agents whose molecules contain both a hydrophobic portion and a hydrophilic portion such as a soap or detergent which do not react with ammonium fluoride. A wide variety of surface active materials is known in the art. See for example the classification and description of commercially known surface active agents by John W. McCutcheon "Chemical Industries," vol. 61, pages 811–822, November 1947. The useful materials include, for example certain alkyl aryl sulfonates, sulfonated alkyl succinates, sulfated fatty alcohols, fatty esters of polyhydroxy alcohols, condensation products of ethylene oxide and fatty acids and the like. The cationic detergents such as the quaternary ammonium compounds also appear useful although they are more expensive at the present time.

About 0.1 to 0.5 weight percent of the surface active agent ordinarily is sufficient to control breakage. Again the concentration of agent employed is based upon the total water content during the treatment, including that contained in the hydrogel. The amount of agent necessary for improvement depends in general upon the nature of the agent and the solids content of the hydrogel. I have found, however, that more than about 1.0 weight percent of the agent should not be employed or the improved resistance to breakage during drying is largely lost.

The use of the surface tension reducing agent also appears to be valuable according to my invention in maintaining the crushing strength of the catalysts of improved porosity at the level of those of the untreated catalysts, e. g., about 145 to 150 pounds. In the case of chrome promoted silica alumina beads, crushing strength appears measurably improved by the combined treatment with ammonium fluoride and a surface active agent despite the significant increase in porosity.

With finely divided gel type catalysts, the use of a surface active agent before drying actually results in increase in porosity of the finished catalyst. I also have observed indication of a synergistic effect between ammonium fluoride and a surface tension reducing agent. Later studies, however, indicate that the density reduction and porosity increase obtained with bead catalysts by means of the ammonium fluoride treatment, is proportional to the ammonium fluoride concentration and except for a slight initial lowering is independent of the concentration of the surface tension reducing agent. I have determined that neither the fluoride nor ammonium ion in the absence of the other is satisfactory for effecting the treatment of my invention. Hydrogen fluoride employed in the treatment produces a somewhat similar but much less pronounced effect than ammonium fluoride. Above a concentration of about 1 percent, the hydrogen fluoride rapidly destroys the gel. Sodium fluoride, with and without a surface tension reducing agent, increases the density, probably due to sintering. Curves plotted upon data reflecting the effect of ammonium chloride alone are linear and horizontal. When the surface tension reducing agent is included, the density increases with increasing ammonium chloride concentration, the salt apparently counteracting the reduction in density due to the surface tension reducing agent alone. Ammonium hydroxide, with and without a surface tension reducing agent, produces a minor decrease in density at concentrations up to 1 percent, but no further decrease results from increased concentration.

My invention will be illustrated in the following example:

In the example, sample A, represents a commercial bead catalyst prepared by drying and calcining silica-alumina hydrogel beads formed by the oil drop method. Sample B represents a catalyst produced according to the method of my invention by soaking the silica-alumina hydrogel beads with an aqueous solution containing 0.5 percent ammonium fluoride and 0.1 percent Igepal CO (alkyl phenyl ether of a poly-ethylene glycol) for three hours. The beads were drained, dried and calcined for two hours at 1350° F. The properties of the two catalysts are compared below:

Table I

|  | A | B |
|---|---|---|
| Apparent Density | 0.70 | 0.55 |
| Average Pore Radius_____A | 29 | 45 |
| N₂ Area_____m.²/gm | 338 | 319 |
| Percent Volatile Matter | 2.16 | 2.30 |

The two catalysts were calcined for 10 hours at 1400° F. and then compared under conversion conditions in bench-scale conversion test apparatus. The catalyst (42.6 parts) was contained in a vertical tubular reactor and was diluted to constant volume in each case by the addition of 80 to 100 parts of 10- to 20-mesh tabular alumina to form equivalent beds. The test is based upon an East Texas gas oil using downflow processing and regeneration. The processing temperature is 900° F. for a period of 30 minutes. The condenser temperature is maintained at 60° F. to effect liquid recovery. The liquid product is redistilled and that portion up to an end point of 410° F. is considered the gasoline yield. The reactor is then purged with nitrogen and passed through the condenser. Following the nitrogen purge, the catalyst is regenerated by passage of carbon dioxide free air for six hours at 1150° F. During this period the effluent gas is passed through an Ascarite absorber to recover carbon dioxide for determination of the coke formed during processing. In a series of runs under the above conditions, the following results were obtained:

Table II

| Catalyst | Wt. Feed/Wt. catalyst/Hr. | Wt. Percent Conversion | Wt. Percent Gasoline | Wt. Percent Coke | Wt. Percent Gas | Gas Gravity |
|---|---|---|---|---|---|---|
| A | 2 | 43.0 | 28.5 | 2.2 | 12.3 | 1.51 |
| A (Check) | 2 | 42.7 | 28.0 | 2.2 | 12.5 | 1.52 |
| B | 2 | 42.1 | 32.2 | 1.02 | 8.9 | 1.52 |
| B (Check) | 2 | 43.5 | 33.6 | 1.01 | 8.9 | 1.52 |
| B | 1.33 | 47.6 | 35.0 | 1.48 | 11.1 | 1.45 |
| B | 6 | 20.8 | 18.4 | 0.24 | 2.1 | 1.33 |

Thus a catalyst treated with ammonium fluoride according to my invention results in significantly improved product distribution, particularly in reduction in the amount of coke produced although the make of dry gas also is markedly reduced.

The following example indicates the effects of my invention when operating with a chrome-promoted silica-alumina bead catalyst.

The starting hydrogel had the following analysis:

| | |
|---|---|
| Percent V. M | 89.6 |
| Percent SiO$_2$ | 89.0 |
| Percent Al$_2$O$_3$ | 10.21 |
| Percent Na | 0.03 |
| Percent SO$_4$ | 0.007 |
| Percent Cr | 0.09 |

The hydrogel was dried at 110° C. and calcined for three hours at 1050° F. to prepare sample 1. This conventional drying and calcination treatment resulted in breakage of 68.5% of the beads. Sample 2 was prepared by soaking the hydrogel in a 0.1% solution of Igepal CO for two hours, draining, drying and calcination. Breakage was reduced to 3.9%. Sample 3 was prepared by soaking the hydrogel for three hours at room temperature in a solution containing 0.5% ammonium fluoride and 0.1% Igepal CO, both based on total water content, including that contained in the hydrogel. These concentrations amount to 144 pounds of ammonium fluoride per ton of catalyst (dry basis) and fourteen pounds of the surface active agent per ton of catalyst (dry basis). Breakage is the same as in the preparation of sample 2 but the apparent density was decreased by 11.4% as compared to the blank, sample 2. The fluorine content was 0.27%. The chromium content was unchanged, but the alumina content was reduced by 13.7%. Sample 4 was prepared in the same manner as sample 3 except that the ammonium fluoride concentration of the treating solution was increased to 2.5%. Breakage was not significantly increased, although the beads scaled somewhat. In the course of these preparations, it was determined that water washing after the ammonium fluoride treatment and before drying and calcination diminished the effect of ammonium fluoride treatment, indicating that the reaction responsible for density reduction and porosity increase apparently occurs at the high temperatures of the calcination. The properties of the above-mentioned catalysts in the cracking reaction are summarized in the following table in which sample 5 represents a commercial chromium bead of the type produced from the above hydrogel, which is included for purposes of comparison.

| Sample | Activity Index | Percent C | Percent Gas | Gas Gravity | Percent Conversion |
|---|---|---|---|---|---|
| 1 | 43.2 | 4.2 | 10.6 | 1.58 | 55.5 |
| 2 | 42.4 | 3.9 | 11.5 | 1.68 | 52.6 |
| 3 | 43.4 | 2.8 | 7.4 | 1.64 | 52.2 |
| 4 | 42.7 | 1.8 | 4.9 | 1.59 | 46.7 |
| 5 | 40.2 | 2.9 | 7.4 | 1.41 | 48.8 |

My invention also is applicable to fluid type silica-alumina cracking catalyst particles. For example, a silica-alumina hydrogel which upon normal processing results in a product having had an apparent density of 0.62 had an apparent density and correspondingly improved porosity of 0.50 when treated with 0.5 percent ammonium fluoride according to my invention. Also I have found that even a spray-dried silica-alumina cracking catalyst after ordinary processing can be treated with ammonium fluoride solution according to my invention. The treated material is redried and calcined to produce catalyst particles of modified structure characterized by reduced density and increased porosity.

The following example illustrates the effect of my invention upon and in operation with a commercial, spray-dried silica-alumina fluid catalyst.

In this example, the parent stock was a sample of an uncalcined commercially available virgin spray-dried silica-alumina fluid catalyst, containing 19.5% volatile matter. A sample of this material was calcined for two hours at 1050° F. and is designated as sample 1 in the following table. Sample 2 is a second sample which was wetted with water, redried and calcined in the same manner. The comparative data on the properties of these catalysts in the cracking reaction show that the water wetting resulted in a marked degradation in the cracking values since treatment with ammonium fluoride requires slurrying in water solutions, sample 2 is to be considered as the blank in the following test data. Samples 3, 4 and 5 were prepared by slurrying the base material for three hours in 1% ammonium fluoride solution at 77° F., 160° F. and 212° F., respectively. The proportion of ammonium fluoride corresponded to 63 pounds per ton of volatile free catalyst. The treated catalysts were dried and calcined. The apparent densities were reduced by an average of 14%. The alumina content was reduced in each case to about one-half that of the blank while the fluorine content appeared to be quite variable, probably related to the difficulty of analysis of this element in the presence of alumina. In the cracking test data, summarized below, it will be seen that samples 4 and 5 which were treated at the higher temperatures have higher activities than the activity of the blank, and the product distribution in terms of gas coke factors for each of the treated catalysts was improved over that of the blank.

| Sample | A. D. | Percent V. M. | Percent Al$_2$O$_3$ | Percent F | Relative Activity | Activity (D+L) | G. F. | C. F. |
|---|---|---|---|---|---|---|---|---|
| 1 | 0.57 | | 13.5 | | 148 | 65 | 0.83 | 0.80 |
| 2 | | | | 0.0 | 86 | 52 | 1.07 | 1.25 |
| 3 | 0.52 | 3.7 | | | 82 | 51 | 0.79 | 0.62 |
| 4 | 0.485 | 2.34 | 6.79 | 0.2 | 134 | 63 | 0.73 | 0.70 |
| 5 | 0.50 | 2.41 | 6.75 | 0.9 | 165 | 68 | 0.77 | 0.73 |

I claim:

1. In the conversion of hydrocarbon oil stocks in the presence of a particle form cracking catalyst at a cracking temperature in which the catalyst is cyclically regenerated by burning off carbonaceous matter deposited in the conversion reaction with an oxygen-containing gas, the improvement which comprises contacting the hydrocarbon stock with a silica-alumina catalyst which has been reduced in apparent density by about 10 to 30 percent and increased correspondingly in porosity by treatment while in the hydrogel state with dilute aqueous ammonium fluoride and calcination of the unwashed ammonium fluoride-treated catalyst.

2. In the conversion of hydrocarbon oil stocks in the presence of a particle form cracking catalyst at a cracking temperature in which the catalyst is cyclically regenerated by burning off carbonaceous matter deposited in the conversion reaction with an oxygen containing gas, the improvement which comprises contacting the hydrocarbon stock with a silica-alumina catalyst in bead form which has been reduced in apparent density by 10 to 30 percent and increased correspondingly in porosity by treatment while in the hydrogel state with dilute aqueous ammonium fluoride and calcination of the unwashed ammonium fluoride-treated catalyst.

3. A silica-alumina cracking catalyst which has been reduced in apparent density by about 10 to 30 percent and increased correspondingly in porosity by treatment while in the hydrogel state with dilute aqueous ammonium fluoride and calcination of the unwashed ammonium fluoride-treated catalyst and which is characterized by improved product distribution in hydrocarbon cracking reactions.

4. A silica-alumina bead form cracking catalyst which has been reduced in apparent density by about 10 to 30 percent and increased correspondingly in porosity by treatment while in the hydrogel state with dilute aqueous ammonium fluoride and calcination of the unwashed ammonium fluoride-treated catalyst, and which is characterized by improved product distribution in hydrocarbon cracking reactions.

5. The method of making a silica-alumina cracking catalyst of reduced density and improved porosity which comprises treating the catalyst while in the hydrogel state with dilute aqueous ammonium fluoride, to reduce its apparent density by about 10 to 30 percent and calcining the unwashed ammonium fluoride treated catalyst.

6. The method of making a silica-alumina bead form cracking catalyst of reduced density and improved porosity which comprises treating the catalyst while in the hydrogel state with dilute aqueous ammonium fluoride and with an aqueous solution of a surface active agent of about 0.1 to 1.0 percent concentration based upon the total water content during treatment, to reduce its apparent density by about 10 to 30 percent and calcining the unwashed ammonium fluoride treated catalyst.

7. The method of claim 5 in which the fluoride is about 0.1 to 1.0 percent dilute aqueous ammonium fluoride.

References Cited in the file of this patent

UNITED STATES PATENTS

| | | |
|---|---|---|
| 2,300,106 | Connolly | Oct. 27, 1942 |
| 2,336,165 | Connolly | Dec. 7, 1943 |
| 2,477,695 | Kimberlin | Aug. 2, 1949 |
| 2,501,197 | Veltman et al. | Mar. 1, 1950 |
| 2,506,923 | Hoekstra | May 9, 1950 |
| 2,618,613 | Kimberlin et al. | Nov. 18, 1952 |